Feb. 3, 1970  W. L. VIPPERMAN  3,492,983
LOW OIL PRESSURE SHUT-DOWN VALVE
Filed June 13, 1968
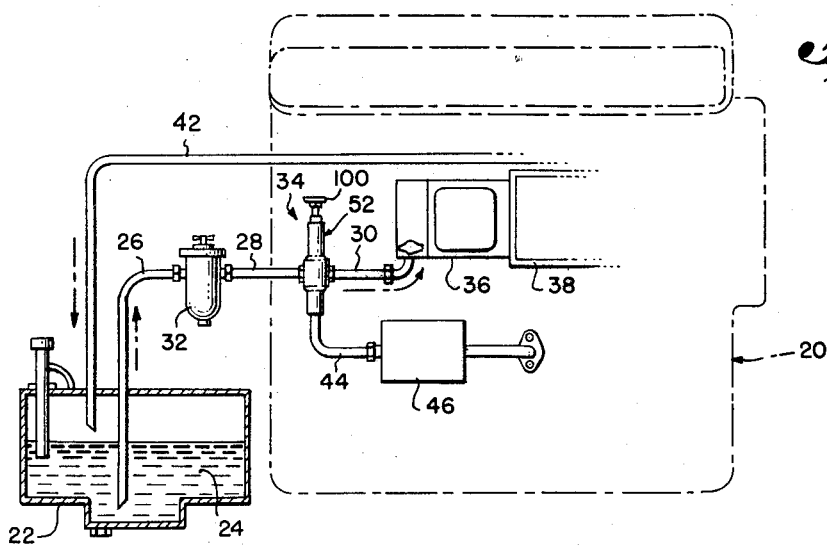
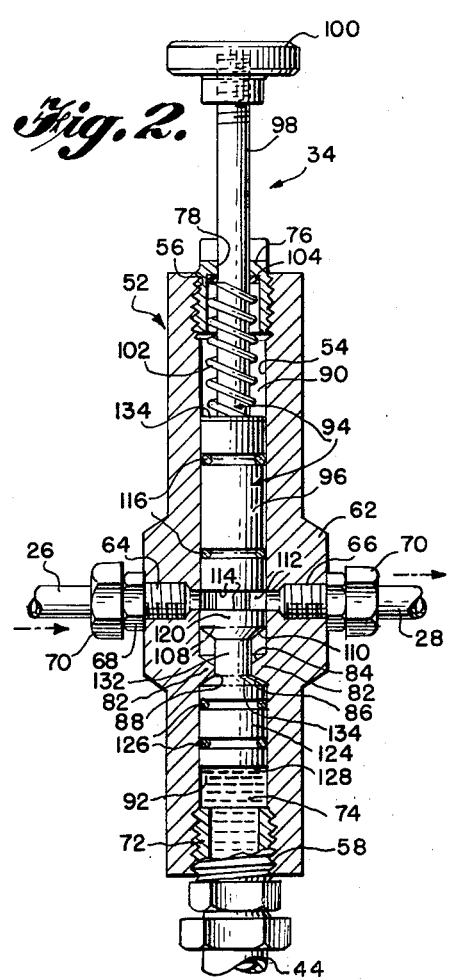
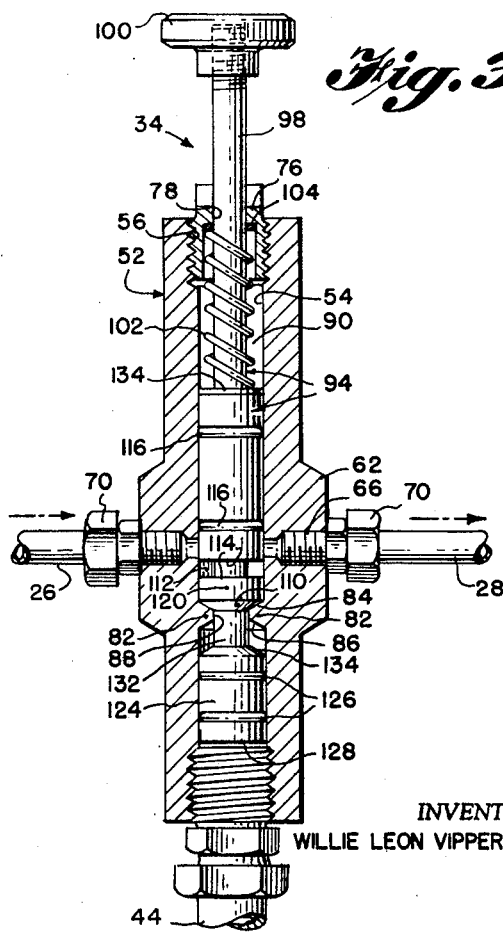
INVENTOR
WILLIE LEON VIPPERMAN
BY
*Stevens, Davis, Miller & Mosher*
ATTORNEYS

United States Patent Office 3,492,983
Patented Feb. 3, 1970

3,492,983
LOW OIL PRESSURE SHUT-DOWN VALVE
Willie Leon Vipperman, R.F.D. 3, Bassett, Va. 24055
Filed June 13, 1968, Ser. No. 736,651
Int. Cl. F02b 77/00
U.S. Cl. 123—198                    10 Claims

ABSTRACT OF THE DISCLOSURE

A lubricating oil actuated engine shut-down valve that is automatically closed by a drop in pressure of the lubricating oil below a safe minimum to cut off the fuel supply to the engine, the valve containing a spring biased piston and an oil pressure operated piston, that, while separate from each other, cooperate in the function of the valve, each piston having a separate valve seating means that alternately engage, one during the open position and the other during the closed position, seating surfaces in the valve bore, and a stem means extending from one piston that provides for the shutting off of fuel to the engine, that extends outside the valve for moving the spring biased piston to open position to start the engine, so that the oil pressure build-up can then maintain the valve open.

---

This invention relates to engine fuel cut-off valves. More particularly, the invention is concerned with a lubricating oil actuated liquid fuel cut-off or shut-down valve device that is easily fitted into the fuel line of an internal combustion engine with the engine lubricating oil connected to it to shut down the flow of liquid fuel to the engine to stop it when the lubricating oil pressure of the engine drops below a predetermined safe pressure, and which can be manually re-set to feed fuel to the engine when the low oil pressure condition has been eliminated to re-start the engine.

One of the problems in lubricating oil actuated valves for shutting off fuel to an engine on occurrence of low lubricating oil pressure is to prevent mixing of the lubricating oil and the fuel being controlled.

Many attempts have been made to provide lubricating oil actuated valves for shutting off fuel to engines when low lubricating pressure occurs. However, the prior art systems either employ floating balls which do not provide a good seating to prevent seepage between the lubricating oil pressure side and the fuel side, or a single plunger arrangement with dual seating where uneven wear, heat warpage or the like causes a loss of the effectiveness of the double seating single plunger unit. Also, dual housing arrangements using dual operatively connected pistons with a single seat present a type of valve arrangement that is not conducive to long trouble-free valve life.

The applicant's invention overcomes the difficulties of the art by contemplating a compact and simplified valve structure that has in it a spring biased piston separate, but co-operatively associated with an oil pressure operative piston with each of the pistons having an individual valve-like seating means, one of the pistons having a passageway in it alignable with fuel inlet and outlet openings in the valve for allowing fuel to pass through it when the openings and passageway are in line and for preventing fuel from passing through it when they are out of line, the passageway being maintained in its axial alignment with the fuel line by the oil pressure and out of alignment by spring pressure when the oil pressure fails.

The valve device of this invention may have a valve body or housing that has an elongated bore and in it, fuel inlet and outlet orifices normal to the axis of the bore. Positioned in the bore is a pair of mutually independent, cooperatively connected or associated pistons or plunger means, one of the pistons having a groove through it that is normal to the axis of the bore. Each of the pistons has means for seating the piston with a valve against a valve seating defined by the bore, and one of the pistons is spring biased so as to oppose the oil pressure applied to the other piston so that, with lubricating oil pressure maintained at a pre-determined level, one of the pistons is seated with the piston having the opening therein in axial alignment with the inlet and outlet openings or orifices in the valve body, and when pressure falls, the spring biasing moves the piston having the opening therein into seating engagement with its valve seat to close off the fuel line. Advantageously, the dual piston arrangement may have suitable sliding gasket means thereabouts so that the pistons are in sealed engagement with walls of the bore during all positions of closing and opening in the operation of the valve.

The valve is placed in the engine fuel line and connected to the engine lubricating system so that the valve will have a supply of lubricating oil pressurizing the piston that holds the piston with the passageway in it in registered alignment with the fuel openings through the valve body. At this point, the latter piston is seated against its valve seat and oil is prevented from seeping into the fuel side of the valve. When lubricating oil pressure is above the predetermined lower limit, the oil forces the other or valve operating or actuator piston against the first or fuel valve piston, thereby aligning the fuel passageway in the first piston with the fuel passage through the valve body which allows fuel to pass through the valve to the engine. When lubricating oil pressure drops below the said limit, the spring forces the fuel valve piston or plunger closed which cuts off fuel to the engine and shuts down engine operation.

Advantageously, a stem or stem-like extension may be provided on one of the pistons and extended from the bore through an opening at one end of the valve body and has a handle attached to it so the stem can pull the valve piston against the spring pressure holding it closed to place the fuel passageway in the valve piston again quickly into registry with the fuel passage through the valve body, allowing fuel to pass to the engine for starting of it with the other plunger pushed in and seated by the lubricating oil pressure produced by engine operation. At engine start-up, the fuel valve piston thus can be held open using the stem and suitable locking means can temporarily hold it in its open position on pulling or draw-out of the stem.

Advantageously, the valve seating means in the bore may have an inwardly protuding annular boss providing valve seating surfaces, preferably beveled, on both its oppositely directed axial faces to provide tight seating thereagainst of matching beveled valve seats provided on the inwardly directed opposed end surfaces of each piston. Also, gasketing O-rings are advantageously provided encircling each piston to provide for a tightly sliding sealing engagement of the pistons in the valve bore. A nib-like extension on one of the pistons for engagement with the other piston, co-operates with a narrow restricted throat opening defined by the boss and dividing the bore into separated chambers to steady piston operation and assist to maintain fuel and lubricating oil out of contact.

It has been found that where two separate pistons are employed to provide for double seating, one to independently actuate the other, each piston will produce a separate tight seating against its seating surface, and any wear of the seating surfaces or imperfections or non-alignments of bore, pistons and seating surfaces in manufacture are accommodated for by the freedom of the operatively connected, but independent movement and seating of the pistons. Thus, by the use of the dual piston arrangement of this invention, a tight seating of the pistons and effective sealing engagement of them in the valve bore is produced which prevents any harmful intermixing of lubricating oil with the fuel during operation of the valve. It will be appreciated that the employment of O-rings about each piston in combination with the dual piston relationship produces a valve that is capable of long trouble-free operation heretofore not found in the art.

It will be appreciated that when edges of the fuel orifices or ports of the fuel passage opening to the valve bore and edges of the fuel passageway in the valve piston are right angular, a positive cut-off or cut-on of fuel flow is effected with minimum linear movement of the valve piston when the passageway in it is moved into and out of alignment with the fuel passage through the valves. This construction provides for minimum disturbance to pressure conditions within the fuel and the valve actuating lubricating oil lines.

Advantageously, also, the annular boss is located toward the lubricating oil end of the valve body a substantial axial distance from the fuel oil passage and thus permits the fuel valve piston to have a sealing apron of a substantial area adjacent the beveled valve seat thereon which maintains the passageway in the piston spaced a significant axial distance from the seating in the surface valve piston chamber for preventing mixing of fuel and lubricating oil.

It will be appreciated that the normal construction of the valve of my invention effectively prevents intermixing of fuel and lubricating oil in the valve, and easy hand resetting of the valve can be accomplished with minimal disturbance to fluid and pressure conditions existing in the engine fuel and lubricating oil systems by the employment of the dual piston arrangement with sliding piston valve close-off of fuel flow in combination with separate valve-like seating of each piston, so that when the valve is open, one piston is seated, and when the valve is closed, the other piston is seated.

Thus the present invention provides for a unique and simplified device for protecting engines from serious damage due to oil pressure failures by providing in a shut-down valve device dual pistons that alternately seat during the closing and the opening of the valve so that the fuel line is maintained free from seeping of lubricating oil that is responsible for the operation of the piston to open position.

It will be appreciated that the valve device of this invention may be used to shut down the feeding of fuel to boilers supplying steam engines when the lubricating oil pressure in the engine fails or in any energy producing system when the flow of fuel or energy generating material being used needs to be controlled because of an abrupt change in pressure within the system.

Additional objects and advantages of the invention will become more apparent from an appreciation of the annexed claims and description and drawings of a preferred embodiment thereof which are intended as only illustrate of my inventive concepts, and in which:

FIGURE 1 is a schematic representation of a diesel engine showing the shut-down valve in the engine fuel line;

FIGURE 2 is a sectional view in elevation of the valve of FIGURE 1 showing it open to pass fuel to the engine; and FIGURE 3 is a sectional view in elevation of the valve of FIGURE 1 closed to prevent passage of fuel to the engine.

Referring to the drawings, a diesel engine 20 is shown provided with an associated fuel tank 22 from which fuel oil 24 is delivered through fuel oil supply lines 26, 28 and 30 to the engine. The fuel oil is drawn in line 26 through a filter 32, line 28 and then into a fuel oil shut-down valve 34, from where it passes via line 30 into an injector valve manifold assembly 36 by suction from fuel oil pump 38. The manifold assembly is intended to represent in the drawing any operable arrangement of fuel injection valves or lines taking fuel oil supplied from the pump and delivering it to the engine cylinders in a known manner. Fuel re-circulating line 42 returns fuel circulated to the manifold through the pump to the fuel tank. A lubricating oil pressure line 44 is taken off the engine lubricating oil supply pressure manifold 46 and connected into the lower end of the shut-down valve 34.

Shut-down valve 34 has a generally tubular housing 52 defining a substantially cylindrical open valve bore 54 extending from a bore opening 56 at the lubricating oil end of the valve housing to a bore opening 58 at its opposite or reset end. The valve housing has an annular housing enlargement 62 approximately midway of its ends which provides a substantial wall thickness defining fuel oil inlet and outlet ports 64 and 66 extending transversely through sides of the valve into the bore and in direct opposite alignment. It will be understood that portions of the valve bore between the inlet and outlet ports complete therewith a passage for fuel to be flowed transversely through the valve from the inlet port into the valve bore and through the outlet port and exit therefrom to the injector valve assembly and thence to the engine cylinders.

Inlet and outlet ports 64 and 66 are each interiorly threaded to receive a threaded hex-head bushing 68 so that connection to the ports can be made of the respective inlet and outlet portions 28 and 30 of the fuel line by threaded standard type compression flare fittings 70. Bore opening 58 of the valve housing provides a lubricating oil inlet to the valve bore and is threaded to receive a hex-head bushing 72 for connection into it of engine lubricating oil 74 through the pressure line 44.

At the opposite or stem end of the valve housing, the bore opening 56 is likewise interiorly threaded to receive a threaded hex-head cap-bushing 76 whose outer end defines an aperture 78.

Within the bore 54 there is an inwardly tapered annular boss 82 which is spaced away from the fuel oil ports a significant distance towards the lubricating oil end of the valve. The boss has a pair of oppositely directed bevels or valve-like seating surfaces 84 and 86. Inner edges of the boss define between them a narrow circular throat 88 which divides the valve bore into a fuel end chamber 90 and a lubricating oil end chamber 92, each bottomed by one of the bevels on the boss.

Arranged in the chamber 90 is a piston or plunger and stem assembly 94 made up of a cylindrical fuel valve piston or plunger 96, a cylindrical stem or stem-like extension 98 thereof provided with a handle 100, a fuel valve spring 102 and annular gasket 104.

It can be seen that fuel valve piston 96 is arranged to slide axially within valve bore 54 and the spring 102 is disposed around the stem-like extension 98 and is maintained centered in the bore by lateral inner surfaces of the cap-bushing 76. The spring is maintained under very slight or no compression in the closed or no fuel flow condition of the valve as shown in FIGURE 3 and greater compression when the valve is in the fuel flow or fuel supplying condition of FIGURE 2. Thus, spring 102 biases the valve piston 96 to cover and close off the fuel ports by spring pressure acting between the inner end of the cap-bushing and a shoulder 106 forming the outward directed end of piston 96 where it is joined to the stem extension thereof.

Valve piston 96 has an inner end provided with a continuous flat inner end surface 108 and a radially outward beveled face 110 joined therewith, which terminates at the sides of the valve piston. The beveled face is angled to the same degree as the piston stop or beveled seating surface 84 of the boss 82, which makes for a tight seating engagement of the plunger on the boss, which seals against fluid leakage when the piston is in fuel close-off position with its face 110 and the surface 84 in contact (see FIGURE 3), as valve head and seat.

At a significant distance spaced away from the beveled face 110, the valve piston 96 is undercut to provide a piston encircling annular groove 112, which provides a fuel passageway around the piston. The groove has spaced flat confronting surfaces 114, which are shown equidistant one from the other, but which can be beveled surfaces so they are spaced more closely nearest the axis of the valve piston to provide a V-shape to the groove if desired.

It will be seen that the inner end of the valve piston also has a substantial cylindrical outer surface area or apron 120 extending between the beveled face 110 and the under-cut portion or groove in order to provide a substantial surface area for additional fluid sealing effect with the walls of the bore. The combined axial lengths of the apron and the groove between outer edges of its confronting surfaces 114 are such that the fuel oil ports will be closed and beveled face 110 seated tightly on surface 84 when the piston is in its closed or fuel shut-down position, and piston 96 valved over ports.

It will be appreciated that where the surfaces 114 make a right or closely similar angle with the outer cylindrical surface of the valve piston 96, a quick cut-off or cut-on of the fuel is effected with a minimum of valve piston axial travel when the shoulders so formed pass the inner edges of the fuel inlet and outlet ports. Piston 96 is of substantial length from about two to about forty times the length of the under-cut or groove, and preferably about twenty times the axial length of the groove. This construction provides a significant degree of stability in the bore of the piston for maintaining tight sliding and sealng engagement of its respective surfaces with those of the valve bore. The piston is further provided with a pair of annular recesses for retaining therein a pair of respective O-rings 116 which provide a tight sliding sealing engagement of the piston in the valve bore.

The O-rings are spaced apart a significant distance, from about two to about twenty-five times, but preferably about eight to ten times the axial "length" of the O-rings, and thus provide between them, when the piston walls do not contact the walls of the bore, pressure drop chambers of substantial axial length along the bore, which assists to make a non-leaking valve construction.

A lubricating oil operating piston 124, of shorter length than the fuel piston 96, slides in tight sealing engagement with the walls of lubricating oil end chamber 92, and is generally of the same cylindrical diameter as the piston 96. A pair of spaced apart O-rings 126 are fitted into annular recesses in the piston wall encircling it for assisting it to make a tight sliding seal in the valve bore.

The valve actuator or oil pressure operating piston 124 has outer end 128 which is a continuous flat surface, and at its inner end, the piston has an annular beveled seat 130 matching the beveled seating surface 86 on the boss 82 and sealing tightly thereagainst when sufficient lubricating oil pressure is present against the outer end 128. The piston also has, on its inner directed end, a cylindrical nib 132 axially centered thereon of a diameter just fitting within the throat 88 formed by the boss 82 and of a length to extend, when the beveled seat 130 is against the seating surface 86, through and beyond the throat a distance such that when the nib engages the inner end of the piston 96 the groove therein will be aligned with the fuel ports thereby completing the fuel passage transversely through the valve body and seat 130 valved on surface 86.

It will be appreciated that as the stem-like extension 98 forms an integral part of the piston 96 and can slide freely in the aperture 78 in cap-bushing 76, the manual release knob or handle 100 can be manually grasped to pull the extension, and with it, the valve piston axially in the bore against the pressure of spring 102 to place the annular groove 112 into registry with the fuel ports opening into the valve bore when there is insufficient lubricating oil pressure acting on outer end 128 of the actuator or operating piston. This action thus completes manually a passage for fuel to flow from the line 28 into fuel inlet port 64 in the valve, through the plunger groove and fuel outlet port 66 into fuel line 30, so that the pump suction can supply fuel to the engine injector valves when starting the engine. Thus the valve can be quickly re-set to fuel delivery condition without delay for any bleed-off or other release of pressure or fluid. Similarly, of course, when sufficient lubricating oil pressure is present against the outwardly directed end 128 of oil pressure operating piston 124, as for example from the engine lubricating oil supply manifold during engine operation, the actuator piston will be forced inwardly in the bore, its nib 132 will engage the inner end of the valve plunger moving the same linearly to place the annular groove in registry with the fuel ports, thus completing the fuel passage through the valve.

It will also be appreciated that when the fuel piston 96 is hand moved against spring pressure, actuator piston 124, as it is separate from the valve piston, is not manually forced inwardly into the bore when there is insufficient lubricating oil pressure behind it. Thus there is little likelihood that the actuator piston can draw a vacuum in the lubricating oil line and allow air to be drawn into the lubricating oil system, which may produce a spongy and ineffectual valve action requiring bleed-off of fluids to purge the system. Consequently, operation of the valve of this invention produces minimal or substantially no appreciable disturbance to pressure conditions in the lubricating oil system.

It will be seen also that in its closed position, fuel valve piston 96 just covers the fuel ports opening into the bore so that a minimum of travel is required of it to place the chamber formed by the groove with the valve bore into communication with the fuel ports and therefore movement of the piston produces substantially no significant pressure fluctuation or disturbance to fluid conditions within the fuel line.

The valve body and parts thereof are preferably machined from metal stock, but can be cast or formed in any other suitable matter, and the bore and seating surfaces can be ground or finished to precisely match with their respective mating parts and surfaces. The O-rings are desirably formed of a material unaffected by fuels, oils and the like, such as butadiene rubbers or other suitable slightly deformable materials.

The spring 102 for closing the fuel valve piston 96 is selected to have the proper compression to provide cut-off of fuel flow at the desired pre-selected low, limiting pressure of the lubricating oil, for example 20 p.s.i.g. Also, one or more shims 134 can be inserted as desired between the inner end of the spring and the annular shoulder 106 to alter the effect of the spring and thus the effective oil pressure at which the fuel flow will be closed off.

Also, the pulling or draw out of stem 98 of the plunger or fuel piston 96 can be done by any means that will draw it out and retain it in its out position permitting fuel flow to the engine around the piston for re-start of the engine until the lubricating oil pressure is built up by engine operation which pressure is sufficient under proper engine operating conditions to itself maintain the fuel valve pistion in open position regardless of the installed position of the valve. Thus it will be understood that the valve of the invention can be installed upright with either end up or horizontally, or in whatever angled position may be required to adapt it into existing engine installations and provide satisfactory service regardless of such installed position.

It will be appreciated that various changes and modifications can be made without departing from the spirit and scope of the invention.

What is claimed is:

1. A fuel control device for positioning in a fuel supply feed line for an internal combustion engine which comprises a valve body having a bore therein with fuel inlet opening, fuel outlet opening, and a lubricating oil opening, all in communication with said bore; spaced first and second valve seating means in said bore; first and second piston means adapted to slidably operate independently and in unison in said bore, each piston having a valve seating means thereon adapted to alternately engage with its mating valve seating means in said bore; biasing means positioned against the first piston and lubricating oil pressure biasing means against the second piston; passageway means in said first piston for conveying fuel through said inlet opening and said outlet opening to supply fuel to the engine when the second piston is biased in seating relationship with its mating valve seating means and when lubricating oil pressure drops below a predetermined minimum, the first piston is moved to bring the passageway means out of line with said inlet and outlet openings and biased against its mating valve seating means to shut off the flow of fuel to the engine.

2. The fuel control device of claim 1 in which said first piston is spring biased.

3. The fuel control device of claim 1 in which said first piston has means that extends outwardly through an end of the valve bore for moving the piston to place the passageway means in alignment with the inlet and outlet openings until the pressure of the lubricating oil is sufficient to hold the second piston in sealed engagement with its valve seating means.

4. The fuel control device of claim 3 in which handle means is attached to said extension for manually setting said valve to open position.

5. The fuel control device of claim 1 in which the passageway means is an annular groove encircling the first piston.

6. The fuel control device of claim 1 in which the valve bore has an inwardly directed annular boss for providing two spaced seating surfaces, and the first and second pistons are each provided with an annular seating surface on axial faces thereof for alternate engagement with the spaced seating surfaces to prevent fuel from mixing with the lubricating oil.

7. The fuel control device of claim 1 in which a slidable sealing means is positioned between the sliding surface of pistons and bore.

8. The fuel control device of claim 7 in which each sealing means is at least one O-ring surrounding the periphery of each piston for producing a sliding seal between the pistons and the wall of the valve bore.

9. The fuel control device of claim 1 in which one of said pistons is provided with a nib-like extension that extends beyond its valve seating means for engagement with said other piston and to move the other piston to a position where the passageway means is in registry with the inlet and outlet openings.

10. The fuel control device of claim 9 in which said nib-like extension is positioned on said second piston.

References Cited

UNITED STATES PATENTS

| 1,339,798 | 5/1920 | Thompson. |
| 1,381,765 | 6/1921 | Thompson. |
| 1,473,303 | 11/1923 | Lightford. |
| 1,740,259 | 12/1959 | Morrison. |

FOREIGN PATENTS

| 1,140,029 | 2/1957 | France. |
| 833,143 | 3/1952 | Germany. |
| 436,029 | 5/1948 | Italy. |

WENDELL E. BURNS, Primary Examiner